United States Patent [19]

Coleman et al.

[11] Patent Number: 4,741,887

[45] Date of Patent: May 3, 1988

[54] GALLIUM COMPLEXES AND SOLVENT EXTRACTION OF GALLIUM

[75] Inventors: James P. Coleman, Maryland Heights; Charles R. Graham, St. Charles; Bruce F. Monzyk, Maryland Heights, all of Mo.

[73] Assignee: Monsanto Company, St. Louis, Mo.

[21] Appl. No.: 937,849

[22] Filed: Dec. 4, 1986

[51] Int. Cl.[4] ............................................. C22B 21/00
[52] U.S. Cl. ..................................... 423/112; 75/121; 260/500.5 H; 556/1
[58] Field of Search ............................ 75/121; 423/112

[56] References Cited

U.S. PATENT DOCUMENTS 3,224,873 12/1965 Swanson ................................ 75/101
3,821,351 6/1974 Lucid .................................. 75/121 X
3,971,843 7/1976 Helgorsky et al. ................. 423/112
4,362,560 12/1982 Abrjutin et al. ........................ 75/63

FOREIGN PATENT DOCUMENTS 245736 12/1985 Japan .

OTHER PUBLICATIONS

Xiang et al., *Acta Metallurgica Sinica*, 18 (2), 221 (1982).

*Primary Examiner*—Patrick P. Garvin
*Attorney, Agent, or Firm*—Wendell W. Brooks; Arthur E. Hoffman; Arnold H. Cole

[57] ABSTRACT

Gallium is extracted in the presence of other metals from gallium bearing aqueous solutions, by contact with organic solvent containing N-organo hydroxamic acids, particularly at described acid and alkaline pH ranges; and recovered from the organic solvent. New gallium complexes and certain N-organo hydroxamic acids are also provided.

28 Claims, No Drawings

GALLIUM COMPLEXES AND SOLVENT EXTRACTION OF GALLIUM

BACKGROUND OF THE INVENTION

The present invention relates to hydrometallurgy. More particularly, it relates to the extraction of gallium metal values from aqueous solutions by solvent extraction techniques employing certain N-organohydroxamic acids as extractants. Further, it relates to gallium complexes of such N-organohydroxamic acids and organic solutions thereof.

Solvent extraction hydrometallurgy is employed in industrial operations to recover valuable metals. The key to implementing this technology has been the availability of suitable metal extractants. Metal extractants, hereinafter extractants, are organic soluble compounds that form organic soluble complexes with metals which allow the transfer of the metal values from an aqueous solution to an organic phase containing the extractant in contact with the aqueous solution, i.e., extraction, which can be represented generally as follows:

| $M_{aq} + E \rightarrow ME$ | (1) |
|---|---|
| $M_{aq}$ = metal in aqueous phase | (A) |
| E = extractant in organic phase | (B) |
| ME = metal complex in organic phase | (B) |

Unwanted nonmetallic and, depending upon the extractant and conditions employed, metallic impurities are left behind in the aqueous phase (A) which is discarded, further processed, or recycled. The metal in the organic phase (B) is then recovered by an aqueous stripping solution phase (C) as follows:

| $ME + SS \rightarrow MSS + E$ | (2) |
|---|---|
| SS = aqueous stripping solution phase | (C) |
| MSS = metal in stripping solution phase | (C) |

The method by which stripping is done depends upon the nature of the extractant and the metal involved. By the stripping process (2) the extractant is regenerated and recycled repeatedly in the extraction process. The metal, now concentrated and purified in the aqueous stripping solution phase (C) can be recovered by conventional methods.

Such solvent extraction processes from recovering metal values are known. See, for example, Kirk-Othmer, Encyclopedia of Chemical Technology, Third Edition, Vol. 6 pp 850-851, Vol. 9 pp. 713-714. U.S. Pat. No. 3,224,873 issued Dec. 21, 1965 to R. R. Swanson discloses a solvent extraction process employing certain oxime extractants for the recovery of copper. U.S. Pat. No. 3,276,863 issued Oct. 4, 1966 to J. L. Drobnick et al discloses the separation of nickel and cobalt values using certain oxime extractants. U.S. Pat. No. 3,821,351 issued June 28, 1974 to M. F. Lucid discloses certain N-substituted hydroxamic acids useful as extractants for the recovery of copper, molybdenum, uranium, iron and vanadium. U.S. Pat. No. 3,971,843 issued July 27, 1976 to J. Helgorsky et al discloses a solvent extraction process employing certain substituted hydroxyquinolines for the recovery of gallium from aqueous alkaline solutions.

Xiang et al in Acta Metallurgica Sinica 18 (2), 221, (1982) describe the use of a certain undefined fatty hydroxamic acid for the recovery of gallium from aqueous acid solutions.

Iwaya, Japanese Patent No. SHO60 (1985) 245736, Appl. No. Sho. 59(1984)-101504, published Dec. 5, 1985, discloses a method of recovering gallium, using hydroxamic acids, described as having —C(O)NHOH groups, from high-basicity aqueous sodium aluminate solutions.

Gallium is a highly valued metal and aqueous solutions containing gallium metal values are obtained from various sources such as zinc production process streams, alumina production process streams and from acid extraction of the flue dust residues from elemental phosphorus production—the so-called "treater dust".

Depending on the source of the gallium solution, various other metal ions may be present in varying amounts, usually in large excess with respect to the gallium (III) ion. These other ions might include aluminum (III), zinc (II), iron (II), and iron (III). A commercial extractant has to exhibit selectivity in extracting gallium (III) in the presence of these other metallic ions. Furthermore, once the gallium (III) has been extracted into an organic solution from the mixture of ions in aqueous solution, it should then be easily extractable, in concentrated form, into another aqueous solution, the so-called stripping solution. In addition, traces of other metallic impurities in the organic solution must be easily removed, i.e., they must not form irreversible complexes with the extracting agent. If such complexes are formed, then the extracting agent in a commercial process will be deactivated and rapidly rendered useless.

SUMMARY OF THE INVENTION

It has now been discovered that certain N-organohydroxamic acid chelating agents selectively extract gallium in the presence of other metals and, furthermore, the gallium may be rapidly and easily stripped from organic solutions containing these N-organohydroxamic acids, as may traces of other metal ions extracted into the organic solution. This contrasts sharply with the N-H hydroxamic acids of the prior art which readily decompose under extraction/strip conditions and from which iron (III), often present with gallium (III), is very difficult to strip.

This unexpected activity of this class of chelating agents provides an efficient process for extracting gallium from aqueous solutions containing gallium by solvent extraction. The advantages of the present invention will become apparent from the following description.

The present invention provides a process for extracting gallium from gallium bearing aqueous solutions which comprises contacting said aqueous solution with a hydrocarbon solvent comprising at least 2% by weight of N-organohydroxamic acid having at least about 8 carbon atoms to extract the gallium from the aqueous solution; separating the hydrocarbon solvent gallium loaded organic phase and recovering the gallium loaded organic phase.

The present invention also provides a process, as described above, with the additional steps of contacting the recovered gallium loaded organic solution with an aqueous stripping solution to recover the gallium from the organic phase; separating the aqueous phase containing the water soluble gallium salts; and recovering the stripped organic phase for subsequent reuse in the extraction of another aqueous gallium bearing feed solution.

Also, the present invention provides a new class of complexes comprising gallium and N-organohydroxamic acid having at least about 8 carbon atoms, a solubility in a hydrocarbon solvent of at least 2% by weight, and little water solubility.

DETAILED DESCRIPTION OF THE INVENTION

The N-organohydroxamic acids can be employed in accordance with this invention in liquid-liquid extraction processes using columns or mixer-settlers such as the reciprocating-plate extraction column, pulse columns or columns employing rotating impellers and the like.

The class of extractants used herein are N-organohydroxamic acids which are soluble in hydrocarbon solvents and substantially insoluble in water. Such hydroxamic acids are of the formula $R_1C(O)N(OH)R_2$ in which $R_1$ and $R_2$ are organo groups, or $R_1$ is hydrogen, and have a total of at least about 8 carbon atoms and preferably not more than about 40 carbon atoms. $R_1$ and $R_2$ are preferably alkyl groups as in N-alkylalkanohydroxamic acids, but can contain aromatic, halogen or other groups, provided that the compounds are water insoluble and the groups do not unduly interfere with functionality as extractants for gallium Exemplifications of $R_1$ and $R_2$ include linear, branched or cycloaliphatic groups although in the case of such cycloalkyl groups as cyclohexyl, care must be taken to have sufficient hydrophobic groups present to provide the desired water insolubility. The hydroxamic acids and their gallium complexes must have appropriate solubility in organic media. The extractants used herein also have high solubility in kerosene and other substantially aliphatic petroleum distillates. $R_2$ frequently represents lower alkyl, particularly of 1 to 3 carbon atoms, or the methyl group. $R_1$ can also have additional N-organohydroxamic acid groups, as in structures wherein $R_1$ represents $R_3CH((CH(R_4))_pC(O)N(OH)R_5)-$, where p can range from 1 to 5, preferably 1. Such a compound is exemplified by di-hydroxamic acids of succinyl compounds; in such compounds at least one of $R_3$ and $R_4$ is an organo radical and the other one be hydrogen, and $R_5$ is an organo radical, and the $R_3$, $R_4$ and $R_5$ organo radicals often have a total carbon number greater than 8 and are preferably alkyl radicals selected from the types of groups described above or illustrated or exemplified herein with regard to $R_1$ and $R_2$. For gallium (III) extraction these dihydroxamic acids are best used in conjunction with a monohydroxamic acids. The synergistic blend extracts gallium from moreacidic or basic media than do monohydroxamic acids when used alone. As will be further described herein, this is a useful property. A particular class of useful N-organo-hydroxamic acids is represented by the formula $CH_3(CH_2)_mC(O)N(OH)(CH_2)_nCH_3$ wherein m is an integer from 6 to 16 and n is an integer from 0 to 6. N-organohydroxamic acids with $R_1$ being a branched alkyl group another than neo alkyl containing 8-17 carbon atoms and $R_2$ being methyl are the most preferred.

It has been discovered that this class of N-organohydroxamic acids, particularly exemplified by N-alkylalkanohydroxamic acids, which are chelating extractants, reversibly extract gallium (III) over a broad range of pH conditions. It happens that gallium (III) exists in aqueous solution in a number of different hydroxide complexes whose relative abundance depends upon pH. The Ga salt is the predominant form below pH 2, but its proportion rapidly declines between pH 2 and pH 4, while the fraction of $Ga(OH)^{2+}$ rises to about 50% at pH 3 and then declines to near zero at pH 5; the $Ga(OH)_2+$ species becomes evident above pH 2, rising to about 65% at pH 4 and then declines to pH 6; $Ga(OH)_3$ becomes evident at pH3, rising to nearly 60% at a little above pH5 and then declining to near zero at pH 7; $Ga(OH)_4^-$ appears at about pH 4 and becomes the predominant form over pH 7. Since the tri-hydroxy species $Ga(OH)_3$ is virtually insoluble in water, and is formed in the pH range from about 3 to about 7, a natural limitation is therefore placed on the pH of commercial gallium-containing solutions which do not utilize solubilizing chelating agents. Gallium might thus be obtained in a solution with pH less than about 3 via acid leaching with acids such as HCl or $H_2SO_4$, or with a pH greater than about 7 via alkaline leaching with alkalies such as sodium hydroxide, lime or aqueous ammonia.

The N-alkylalkanohydroxamic acids described herein have been shown to extract gallium(III) from aqueous solution rapidly and selectively in the pH range from about 0.5 to about 12 and to be rapidly stripped of gallium(III) by aqueous solutions with a pH outside this range. This range of pH for gallium(III) extraction coupled with two pH ranges for gallium(III) stripping, namely less than about 0.5 or greater than about 11 or 12, allows the use of these N-alkylalkanohydroxamic acids in a process for gallium(III) extraction from either acidic or alkaline leach solutions and subsequent recovery of the gallium(III) via stripping with either strong acid or strong base. Actually, there is generally some overlap in extraction and stripping conditions, and stripping can be accomplished, for example at pH's of about 11 or 11.5 or above. However, efficiencies are affected, as an extraction, for example, will have low efficiency under conditions where a large proportion of the Ga is partitioned into the aqueous phase.

In addition to the above hydroxamic acid compounds the organic phase of the extractant comprises a liquid hydrocarbon solvent. Such solvent must be substantially water immiscible so as to be separable from the aqueous solutions originally containing the gallium values. Suitable solvents include aliphatic and aromatic hydrocarbons such as kerosene, hexane, toluene, methylene chloride, chloroform, carbon tetrachloride, xylene, naphtha, cyclohexane, Chevron Ion Exchange solvent, Kermac 470-B, Solvesso 100 and the like. Kerosene and other distillates are preferred. Generally, the hydroxamic acid compounds will be present in the organic phase in an amount of at least about 2% by weight. Preferably, the N-alkyl alkanohydroxamic compound will be present in the amount of 2 to 40%, more preferably about 10 to 35%, by weight based on the total organic phase. Viscosity and/or solubility serves to fix the upper limit of the content of said hydroxamic acid compound which will depend upon the structure of the compound employed. Normally, an amount of above about 20% by weight is employed although amounts as high as 60% can be functional. Certain structures, for example, N-methyl isostearo-hydroxamic acid N-methylnonano hydroxamic acid, have sufficiently low viscosity that they can be used neat, i.e. without a solvent. Where high complexing salt concentrations are present as in phosphate rock treater dust leachate, the extractant efficiency drops off at extractant concentrations less than 10%; while efficient extraction is obtained at even 2 to 5% concentration in the absence of other complexing salts. With N-alkyl naphtheno hydroxamic acids, 20%-30% or so is preferred as higher concentrations tend to have high viscosity.

The organic phase may also contain modifiers which can be a long chain aliphatic alcohol, such as isodecanol or phosphate esters, such as tributylphosphate. Modifiers serve to prevent third phase formation, aid in phase disengagement and/or increase extractant solubility in the hydrocarbon solvent. If a modifier is used, it can be used in amounts of about 0.5% to 50%, or greater, by volume of the hydrocarbon solvent, preferably about 5%. Certain paticular types of modifiers, referred to herein as co-extractants, serve to improve the efficiency or speed of the extractions, as further described herein.

In carrying out the process of this invention the gallium bearing aqueous solution is contacted batchwise or continuously with the extractant solvent comprising at least 2% by weight of the N-organohydroxamic acid. The aqueous feed solution bearing gallium can be adjusted to provide an equilibrium pH in an appropriate range depending upon the particular hydroxamic acid extractant employed and upon the type of leach solution being extracted, as described previously. The volume ratio of the aqueous phase to the organic phase should be selected to most effectively remove the gallium from the aqueous phase without requiring undue volumes of materials. Aqueous phase to organic phase volume ratios of from 1:20 to 20:1 are believed to be effective, although other ratios may prove effective depending upon the specific characteristics of the solvent extractant, the gallium bearing aqueous solution and equipment employed. Phase contact can be achieved using, for example, mixer-settlers. In the mixer, one phase is dispersed within the other by stirring or some other suitable means of agitation. The extractant forms a complex with the gallium within the organic phase of the two-phase liquid mixture. The dispersion then flows to the settler where phase disengagement occurs under quiescent conditions. Generally, extraction can be carried out at temperatures in the range of 0° C. to 90° C. or more, preferably in the range of about 35° C. to about 70° C. Most preferred is about 50° to about 60° C.

It may be desirable to scrub the galliumloaded organic phase to remove co-extracted metal ions and entrained agueous phase in order to achieve the desired purity depending on the particular gallium bearing aqueous feed solution employed. This is achieved by washing the gallium loaded solvent with water, aqueous ammonia, dilute acid or an aqueous solution of a gallium salt.

The gallium values extracted from the aqueous feed solution into the organic phase can be stripped from the loaded organic phase without decomposing the hydroxamic acid by contacting one part by volume of it with about 0.05-10 parts by volume, preferably about 0.5-2.0 parts by volume, of an aqueous solution at 0°-80° C., preferably about 15° C.-60° C. The aqueous solution used for stripping the loaded organic phase can be a solution of a mineral acid, caustic or ammonia. Suitable mineral acids include sulfuric, hydrochloric, hydrofluoric, nitric and the like. The preferred mineral acid solution is sulfuric acid containing about 10-400 grams of sulfuric acid per kg. solution, preferably about 100-300 grams per kg. solution. In percentages, this is 1 to 40% sulfuric acid, and preferably 10 to 30%. Suitable aqueous ammonia solutions are solutions containing 50-300 grams ammonia per kilogram of solution, preferably about 100-200 grams per kilogram of solution. Suitable caustic solutions are 5-400 grams NaOH, preferably about 5-80 grams NaOH, per kilogram of solution or 5-500 grams per kilogram solution of KOH, preferably about 5-100 grams per kilogram solution. Phase contact with the stripping solution can be achieved with mixer-settlers, or other suitable devices. In this manner the gallium is recovered from the organic phase into the stripping solution as a gallium salt. The gallium-bearing stripping solution can be treated by conventional means to recover gallium metal, for example, by electrolytic reduction of an aqueous caustic solution of the gallium.

The stripped gallium-free solvent extractant is recycled to the extraction circuit for treatment of additional aqueous feed solutions bearing gallium. This ability for recycle appears unique to these hydroxamic acids as substantial decomposition by hydrolysis generally occurs during stripping, particularly under acid conditions, with N-H hydroxamic acid compounds.

The present invention also relates to the gallium complexes of the N-alkylalkanohydroxamic acids and to the organic solvent solutions thereof. The term gallium complex of the N-alkylalkanohydroxamic acids is meant to include compositions of the N-alkylalkanohydroxamic acid having at least about 8 carbon atoms combined with significant amounts of gallium in the gallium (III) ionic state. Said solutions thereof comprise the hydrocarbon solvent and at least 2% by weight of the gallium complex of the N-alkylalkanohydroxamic acid. In addition to using these gallium complexes in the above-described processes for recovering gallium from aqueous leach solutions, these complexes can be used as a source of very pure gallium for various applications such as light emitting diodes, fiber optics, radiation resistant integrated circuitry, opto-couplers, high speed electronics, etc. These gallium complexes when isolated from the solvent are viscous oils or solids. For convenience of recovery, these complexes were prepared by contacting the hydroxamic extractant in a volatile organic solvent such as methanol, ethanol, petroleum ether and the like with a gallium source, such as $Ga_2(SO_4)_3$ and a base such as sodium hydroxide to neutralize the acid produced upon completion to form the complex and isolating the nonvolatile complex by removing the solvent through evaporation. For example, tris(N-methyl nonanohydroxamato) gallium(III) and tris(N-methyl naphthenohydroxamato) gallium(III) were prepared.

Methods of preparing the N-alkylalkanohydroxamic acids are known. Such compounds can be prepared by the reaction of a N-alkylhydroxyamine with a carboxylic acid chloride. For example, N-hexyldecanohydroxamic acid is prepared by the dropwise addition of a solution containing 0.064 moles of decanoyl chloride in about 250 ml of methylene chloride to a stirred 2 liter reaction flask charged with 0.064 moles of N-hexylhydroxylamine and 700 ml of methylene chloride maintained at about −25° C. with a dry ice bath. After all the decanoyl chloride is added, 0.064 moles of triethylamine in about 250 ml of methylene chloride is added to remove the HCl by product. The reaction mixtures are quenched with 10 ml of glacial acetic acid and are washed with five 500 ml portions of water. The organic reaction mixture is dried with calcium sulfate and the methylene chloride solvent is removed by rotary evaporation leaving an oily liquid which is allowed to solidify at −20° C. and is recrystallized in ethyl acetate and dried to provide N-hexyldecanohydroxamic acid having a melting point of 37° C.

The N-organohydroxamic acids used herein can in general be prepared by reaction of N-substituted hydroxyl amines with carboxylic acid chlorides. The reaction can be effected by adding the carboxylic acid chloride simultaneously with a base, such as aqueous NaOH, to a solution of the N-alkylhydroxyl amine in organic solvent. The product is purified by thorough water washing to remove by-product salts.

EXAMPLE A

A solution containing 54 parts by weight tetrahydrofuran and 40 parts by weight N-methylhydroxylamine and a small amount of water is charged to a jacketed, stirred reactor along with 100 parts by weight water. Nonanoyl chloride, 99.1 parts by weight and 44.9 parts by weight 50% NaOH are added at equivalent rates to the solution at 0° C. and slowly enough to maintain the refrigerated section temperature below 10° C., the addition taking about 2.5 hours. The refrigeration is then shut off and the reaction is stirred another 3 hours as the temperature rises to 25° C. The stirrer is stopped, the phases are separated, and the aqueous salt solution is drained off. The organic solution is washed three times with 100 parts by weight of 1% acetic acid solution, and the remaining tetrahydrofuran is stripped to leave 100 parts by weight of N-methylnonanohydroxamic acid, a yellow fluid. Analysis is 95±5% of the hydroxamic acid, represented by the formula: $CH_3(CH_2)_7C(O)N(OH)CH_3$. Other N-alkylhydroxamic acids can be prepared by the procedure illustrated in Example A. For example, N-methylnaphthenohydroxamic acid can be prepared by utilizing naphthenoyl chloride, 101.2 parts by weight, in place of the nonanoyl chloride. The naphthenoyl chloride can be prepared by mixing naphthenic acid, 116.4 parts by weight and $PCl_3$, 27.7 parts by weight, and heating to 50° C. with gentle stirring. After about 15 minutes, a lower layer of posphorous acid begins to form, and after one hour, stirring is stopped and the lower layer is drained. Excessive stirring is avoided, and after about 2.5 hours total reaction time with continued drainage of phosphorous acid as formed, the crude naphthenoyl chloride is pumped to a stripper for removal of $PCl_3$ by vacuum distillation. Lower oxides of phoshorus collect on the distillation flask, and the clear naphthenoyl chloride is decanted off, filtered and distilled over a wide temperature range, about 120° C./5 mm Hg to about 170° C./9 mm Hg, due to the wide molecular weight range of the naphthenoyl moiety. Naphthenic acid is a very complex mixture of natural-based carboxylic acids. It is obtained from naphthenic oils by saponification, separation from the oils, acidification and distillation to obtain the desired cut of molecular weight. While various naphthenic acids are suitable, a typical example is of 250 M.W. and represented by the formula:

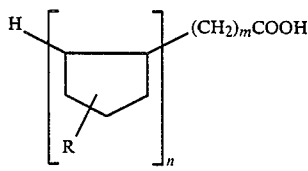

where n=1 to 5, mostly 1 and 2; m is greater than 1; R=methyl, ethyl, propyl or higher groups. The naphthenic acids contain about 10% unsaponifiable, residual naphthenic oils, which are not taken into account in the molecular weight which is based upon the oil-free acid number after the oils have been extracted. The high molecular weight oils may not carry over in the distillation of the naphthenoyl chloride and any amounts present in the acylation reaction would not form hydroxamic acids. The product N-methyl naphthenohydroxamic acid obtained in an exemplary acylation procedure averages about 279 molecular weight, and is represented $RN(OH)CH_3$, wherein R represents the naphtheno group. N-methyl isostearohydroxamic acid and N-methyl 2 hexyldecano hydroxamic acids can be produced in similar procedures.

Bis-hydroxamic acid compounds can be obtained in a similar manner by reacting compounds with two acid chloride functions with a hydroxylamine. Thus, an N,N'-dialkyl-alkylsuccinyl-dihydroxamic acid can be prepared by reacting an alkyl hydroxyl amine with an alkyl succinyl dichloride. In such a reaction, four moles of the hydroxyl amine, e.g. N-methylhyroxylamine, can be employed per mole of the succinyl compound, e.g. n-decylsuccinyl dichloride, in order to provide 2 hydroxamic acid moieties, as well as sufficient of the hydroxylamine to form a salt with the two mole of HCl released. Alkyl hydroxyl amines can be readily prepared from ketooximes and aldoximes by reduction with sodium borohydride. (J. Am. Chem. Soc., 1971 Vol. 93(12), 2897). The prodedure is useful for a wide range of alkyl chain length and branching.

EXAMPLE 1

A gallium extraction was carried out in a stirred beaker, utilizing N-ethylnaphthenohydroxamic acid as extracting agent. A 20 ml solution that was 1.6M in the hydroxamic acid in a petroleum distillate fraction (Kermac 470-B) was provided in the beaker by mixing 11.632 grams of 880.6% purity N-ethylnaphthenohydroxamic with the petroleum distillate to bring the volume to 20 ml. An equal volume of an aqueous phosphate treater dust leachate solution containing gallium was added. The gallium level in the leachate solution was 597 ppm and its pH was 1.55. The extraction was carried out at circa 55°-60° C. with stirring, and sampling of the aqueous phase at intervals (with interruption of the stirring). Results were as reported in Table 1.

TABLE 1

| Time (minutes) | Ga Remaining (PPM) | % Ga Extracted |
|---|---|---|
| 5 | 544 | 9 |
| 10 | 384 | 36 |
| 25 | 253 | 58 |
| 35 | 231 | 61 |

At the end of the extraction, the organic and aqueous phases were separated. The organic phase was washed three times with 20 ml portions of 2% sulfuric acid, the washings being conducted at 57°-59° C. for five minutes each. Analysis indicated that 2% of the gallium was removed in the washing. The organic phase was then combined with 20 ml of 30% $H_2SO_4$ in a procedure to strip the gallium. The stripping was carried out at about 60° C. with sampling at intervals to determine the amount of gallium present in the aqueous phase. The results indicate 68% of the gallium was stripped in five minutes and thereafter the percentage only increased to 71% at 25 minutes (with an anomalous 79% determined at 20 minutes). The overall recovery of gallium from the extraction, washing and stripping was 42%.

The aqueous mineral solution employed above, both before and after extraction, was analyzed for Al, Fe and Zn content, and the combined dilute sulfuric acid wash solution and sulfuric acid strip solutions were also analyzed with results as reported in Table 2.

TABLE 2

|  | Al | Fe | Zn |
|---|---|---|---|
| Starting aqueous solution | 2240 ppm | 3100 ppm | ~54,000 ppm |
| Aqueous solution after extraction |  |  |  |
| concentration present | 2020 ppm | 1900 ppm | ≧53,222 ppm |
| % Extracted | 10% | 39% | ≦1% |
| Washings |  |  |  |
| Concentration present | 11.3 ppm | 4.3 ppm | 226 ppm |
| stripping % | 85% | .36% | 99.6% |
| $H_2SO_4$ Stripping Solution |  |  |  |
| Concentration present | 2.3 | ~84 ppm | 1 ppm |
| Stripping % | 17% | ~7% | 0.4% |

The yield of Ga from the above extraction, washing, and stripping procedures was 42%, compared to 0.1% for Al, 3% for Fe and 0.002% for Zn. The selectivity for gallium, particularly with respect to iron, is very unusual and an important advantage of the invention.

EXAMPLE 2

An extraction was carried out utilizing the procedure described in Example 1 and employing N-methylneodecanohydroxamic acid as extracting agent at a 1.6M concentration in petroleum distillate (Kermac 470-B). At five minutes, 3% of the gallium had been extracted. The amount of gallium extracted gradually rose to 16% at 1.5 hours. The organic phase from the extraction was washed three times with dilute sulfuric acid and then treated with 30% sulfuric acid to strip the gallium. At 5 minutes, 84% of the gallium had been removed and the stripping was completed in 15 minutes. Analysis indicated that very little of the Al, Fe and Zn in the starting solution had been extracted. The yield of Ga was 16%, compared to near zero for Al, 0.2% for Fe and 0.03% for Zn.

EXAMPLE 3

For comparison, an extraction was carried out employing neodecanohydroxamic acid, in accord with the procedure of Example 1. A 1.6M solution of the agent in petroleum distillate (Kermac 470-B) was used and the initial level of gallium in the aqueous solution was 554 ppm. After 5 minutes only 3 ppm remained, indicating 99% extraction. The organic phase solidified upon cooling, so it was heated for washing with dilute sulfuric acid. Three washings removed only about 1% of the Ga. A 30% sulfuric acid solution was used for stripping, but stripped only 4% of the Ga from the organic phase in three hours. The starting aqueous solution had contained 2300 ppm Fe, and only 480 ppm remained after exraction, for 79% extraction. The 30% $H_2SO_4$ stripping solution after use contained 4.4 ppm Fe, for a stripping efficiency of 0.2%. These results illustrate the inferiority of neodecanohydroxamic acid, an N-H hydroxamate, for gallium extraction since solids form and extracted gallium and iron cannot be recovered by stripping.

EXAMPLE 4

An extraction was carried out employing a 1.6M solution of N-n-propylnaphthenohydroxamic acid in petroleum distillate and using the procedure of Example 1. The aqueous solution to be extracted contained 574 ppm Ga. The amount extracted was 8% in 5 minutes, 25% in 10 minutes, 54% in 20 minutes, 60% in 25 minutes and 65% in 35 minutes. Three washings of the organic phase at 56°–58° C. with 2% sulfuric acid stripped 3% of the Ga. The organic phase was then treated with 30% sulfuric acid at 55° to 58° C., stripping 77% of the Ga in five minutes, with the value anomalously dropping to 74% at 15 minutes. Of the 3300 ppm Fe present in the original aqueous solution, results indicated that 3% was extracted. The Zn extraction was 5%, and Al extraction was 8%. Thus excellent selectivity for gallium was demonstrated even in the presence of iron(III).

EXAMPLE 5

Gallium was extracted from an aqueous leach solution, employing a 1.6M solution of N-methylnaphthenohydroxamic acid for the extraction, and following the procedure of Example 1. The starting aqueous solution contained 535 ppm gallium. The extraction had removed 61% of the Ga at 5 minutes, 81% at 15 minutes, and the extraction was relatively constant at 84% on sampling at intervals from 20 to 35 minutes. Washing the organic phase three times with 2% sulfuric acid stripped 1-2% of the Ga. The organic phase was treated with 30% sulfuric acid, with 81% of the Ga being stripped in 5 minutes, and no increase in that value up to 15 minutes. The overall yield of Ga from two extractions, washing and stripping was 66%.

The original aqueous solution contained 2600 ppm Fe. The percentage Fe extracted was 38%, and stripping efficiency with 30% sulfuric acid was 28%, for an overall yield of 11%. The Zn extraction was 4% and the Al extraction no more than 2%.

EXAMPLE 6

For comparison, a gallium extraction was carried out as in Example 1, employing 1.6M naphthenohydroxamic acid in petroleum distillate (Kermac 470-B) as extractant. The hydroxamic acid analyzed as 46.28% pure, so 20.736 grams was used in the 20 ml. solution. A 2 ml amount of Kermac 470-B was added to improve blending. The aqueous solution to be extracted contained 493 ppm Ga. After 5 minutes extraction at 55°–58° C., 3.6 ppm remained, showing 99% extraction. The organic phase was washed three times with 2% sulfuric acid, and analysis indicated no Ga was removed in the washings. The organic phase was then treated with 30% sulfuric acid for stripping, with 35% of the Ga being stripped in 5 minutes, 48% in 15 minutes, 58% in thirty minutes, 69% in one hour, 77% in 1.25 hour, and 78% in 1.5 hour. However, analysis showed that 45% of the naphthenohydroxamic acid was hydrolyzed in a single extraction-wash-strip cycle, indicating that the Ga is primarily being freed from the chelate complex by hydrolysis of the hydroxamic acid. The original aqueous solution contained 3100 ppm iron and the extraction of that was 35%. The stripping efficiency for iron in the 1.5 hour treatment with 30% sulfuric acid was 29%, providing an overall iron yield of 10.3%. The Al extraction was 4% and the Zn extraction was 5%.

The results for Ga and Fe in Examples 1 through 6 are summarized in Table 3. In the Table, and elsewhere in the application, the term "HA" is at times used to designate hydroxamic acid.

TABLE 3

| HA | Ga | | | Fe | | |
|---|---|---|---|---|---|---|
| | Extraction | Strip | Yield | Extraction | Strip | Yield |
| N—methyl neodecano | 16% | 100% (84% at 5 min.) (1.5 hour) | 16% | 2% | N.A. | 2% |
| N—H neodecano | 99% (5 min) | 4% (3 hours) | 4% | 79% | 0.2% | 0.2% |
| N—ethyl naphtheno | 61% | 71% (68 at 5 min) | 42% | 39% | 7% | 3% |
| N—propyl naphtheno | 65% | 77% (5 min) | 50% | 3% | (100) | 9% |
| N—methyl naphtheno | 84% (61% at 5 min.) | 81% (5 min.) | 66% | 38% | 28% | 11% |
| N—H Naphtheno | 99% | 78% (1.5 hours, 34 at 5 min.) | 78% | 35% | 29% | 10.3% (1.5 hours) |

EXAMPLE 7

A gallium extraction was carried out as in Example 1, employing a 1.6M solution of N-methyl-p-n-decylphenylhydroxamic acid in petroleum distillate. The starting gallium concentration of 496 ppm was reduced to 64 ppm in 5 minutes, an extraction of 87%, and at 10 minutes the extraction was 99%. The extraction was carried out at 64°-65° C. The gallium-loaded organic solution was subjected to washes with 2% sulfuric acid. Analysis indicated the combined wash solution (65.9 ml) had a Ga level of 0.8 ppm. The organic solution was then stripped at 64° C. by treatment with 30% sulfuric acid. The gallium removal was 6% at 5 minutes, 24% at 15 minutes and 37% at 30 and 60 minutes. The overall yield of gallium was 37%. Of the 1740 ppm iron in the starting aqueous solution, 81% was extracted, and the stripping efficiency with the 30% sulfuric acid was 6% for a yield of 4%.

The extent of hydrolysis of the hydroxamic acids used in Examples 6, 5, 1 and 4 was determined by spectrophotographic analysis of the solutions after the extraction, washing and stripping procedures were completed, with results as set forth below in Table 4.

TABLE 4

| Extractant | % Decomposition |
|---|---|
| N—H naphthenohydroxamic acid | 45.0% |
| N—Methylnaphthenohydroxamic acid | +0.14% |
| N—Ethylnaphthenohydroxamic acid | −0.53% |
| N—Propylnaphthenohydroxamic acid | +0.74% |

The results show that the unsubstituted hydroxamic acid had a very high decomposition, 45%, while the N-alkyl substituted hydroxamic acids had very little decomposition, with the minor variances from zero decomposition (above or below) being within the range of error of the analysis. The lack of stability of unsubstituted hydroxamic acids has been reported in the literature; see Pushlenkov et al, Proceedings International Solvent Extraction Conference, 1974, Vol. 2, pp 1129-43, in which hydrolysis rates of caprylhydroxamic acid were given with a conclusion that below 0.01M nitric acid hydrolysis occurs rather slowly, permitting use of caprylhydroxamic acid for extracting certain metals from aqueous substrate solutions containing not more than 0.1M nitric acid. However this prevents the use of acid solutions for stripping as is normally desired from a practical standpoint to recover the gallium and to regenerate the extractant. The publication also describes formation of precipitates from the hydroxamic acid and certain metals. A further indication of the instability of N-H hydroxamic acids is the poor shelf life of such compounds as it has been noted that several of such compounds decomposed when completely stored.

The zero percentage decompositions reported in Table 4 from spectrophotographic analyses for the hydroxamic acid in the solution. The method measures the apparent molecular absorbance at $\lambda$ max where the maximum peak is obtained for a monohydroxamato iron (III) complex obtained by treating a specified quantity of the hydroxamic acid solution with an aqueous solution of ferric nitrate and nitric acid and n-butanol. The method is specific for hydroxamic acids and utilizes a peak in the 495-530 nanometer region of the spectrum. Some additional, less careful determinations, were made of the hydroxamic acid content of the samples from Table 4 and several additional hydroxamic acid solutions which had been used as extractants, with results as follows:

| HYDROXAMIC ACID | $\lambda$ MAX | % DECOMPOSITION |
|---|---|---|
| Naphtheno HA | 512 | 42.5% |
| N—methyl naphtheno HA | 514 | 4.99% |
| N—ethyl naphtheno HA | 514 | 1.0% |
| N—propyl naphtheno HA | 515 | 4.6% |
| Neodecano HA | 494 | —* |
| N—methyl neodecano HA | 502 | 0.13 |
| N—phenyl naphtheno HA | 458 | —** |
| N—methyl 4-decylbenzo HA | 515 | 38.6% |

*Anomalous, impossibly high HA concentration; aqueous solution had a little purple color
**Not a hydroxamate iron$^{+3}$ complex since $\lambda$ max = 458 nm; smelled of nitrobenzene.

EXAMPLE 8

A continuous extraction, stripping and scrubbing operation was carried out to remove gallium values from a phosphate rock treater dust leachate. A 30% solution of N-methyl nonanohydroxamic acid in petroleum distillate (Kermac 470-B) was used as the extractant. The extraction circuit involved a continuous counter-current extraction with four 800 ml extraction vessels in which the aqueous mineral containing stream containing gallium was conducted in series through extraction vessels 1, 2, 3 and 4 in series and discharged as raffinate from vessel 4, while an organic stream was conducted through the extraction vessels in reverse order, i.e. 4, 3, 2 and 1, and conducted as a gallium-loaded organic stream to the stripping circuit. In the stripping circuit the organic stream was conducted through a series of three stripping vessels, 1, 2 and 3, in each of which 30% sulfuric acid was recycled internally. The organic discharge from strip 3 vessel was conducted to a scrubbing circuit where it was conducted through 2 vessels in series, i.e. scrub 1 and scrub 2, and the organic discharge from the second vessel could be recycled to the extraction, while the raffinate from the scrub circuit could be recycled to the treater dust leaching operation. An equal volume mixture of 20% sulfuric and 20% phosphoric acid was used as the scrubbing solution. The strip solutions from the stripping circuit contained the desired gallium product. The aqueous mineral solution utilized in the operation was a leachate of phosphate rock treater dust and initially contained 407 ppm gallium, 2420 ppm Fe, 89,000 ppm Zn, 3340 ppm Al, and 93,000 ppm P. During the eight-hour operation, new treater dust leachate feed solutions were needed to maintain a feed stream. The gallium concentration in the feed changed to 353 ppm at about hour 4, 395 ppm at about hour 5, and 336 ppm at about hour 7; there were also some variations in the concentrations of the other metal components in the feed. The initial 1.03 pH changed to a more desirable 1.36 at about hour 5. The initial flow rates were 0.17 liters/minute organic stream and 0.17 liters/minute aqueous stream, and the rates were near the 0.17–0.19 range through most of the eight hours. Samples of the raffinate from the four extractions, the three strip solutions, and the two scrub solutions were taken and analyzed for gallium content with results as reported in Table 5.

TABLE 5

| | HOUR | | | | | | | |
|---|---|---|---|---|---|---|---|---|
| | 1 | | 2 | | 3 | | 4 | |
| Sample | T (C.°) | Ga (ppm) | T (C.°) | Ga (ppm) | T (C.°) | Ga (ppm) | T (C.°) | Ga (ppm) |
| E4 | 38° | 73 | 46.6 | 73 | 47.5 | 96 | 49.3 | 129 |
| E3 | 41° | 98 | 50.3 | 104 | 52.0 | 169 | 53.0 | 170 |
| E2 | 43.5 | 152 | 52.3 | 156 | 53.5 | 265 | 53.6 | 236 |
| E1 | 47.0 | 255 | 53.6 | 242 | 53.5 | 307 | 55.0 | 312 |
| S1 | 40.7 | 840 | 50.6 | 1890 | 54.0 | 2640 | 54.0 | 3600 |
| S2 | 37.8 | 134 | 48.0 | 304 | 50.5 | 529 | 50.5 | 1130 |
| S3 | 36.1 | 59 | 46.4 | 76 | 48.0 | 132 | 49.6 | 241 |
| SB1 | 34.5 | 294 | 45.0 | 240 | 48.0 | 266 | 47.3 | 296 |
| SB2 | 31.5 | 303 | 44.7 | 269 | 47.0 | 291 | 45.0 | 306 |

| | HOUR | | | | | | | |
|---|---|---|---|---|---|---|---|---|
| | 5 | | 6 | | 7 | | 8 | |
| Sample | T (C.°) | Ga (ppm) | T (C.°) | Ga (ppm) | T (C.°) | Ga (ppm) | T (C.°) | Ga (ppm) |
| E4 | 49.7 | 114 | | 98 | 50.8 | 60 | 50.8 | ND |
| E3 | 54.0 | 172 | | 150 | 55.0 | 102 | 54.0 | 36 |
| E2 | 54.6 | 234 | | 215 | 54.7 | 122 | 55.3 | 79 |
| E1 | 54.0 | 258 | | 272 | 54.4 | 188 | 54.5 | 151 |
| S1 | 53.3 | 3850 | | 4750 | 52.0 | 5710 | 53.5 | 6270 |
| S2 | 52.0 | 1360 | | 1920 | 50.3 | 2810 | 51.5 | 3470 |
| S3 | 49.4 | 382 | | 660 | 50.0 | 1080 | 50.0 | 1630 |
| SB1 | 49.0 | 300 | | 358 | 47.3 | 393 | 48.1 | 488 |
| SB2 | 46.5 | 292 | | 310 | 44.7 | 317 | 45.0 | 314 |

Frdom the data in Table 5 it can be seen that each extraction in turn removed a substantial amount of the Ga, as the original 407 ppm Ga was lowered to 250 to 300 ppm or so in E1 and ultimately to low concentrations such as about 45 to 70 ppm or so in E4, or even a nondetectable amount in the E4 raffinate at hour 8. The higher pH of the latter feed solutions produced the higher recoveries. The sulfuric acid stripping solution was effective and produced higher Ga concentrations in the first strip than in the second and third strips, and showed high loadings such as 6270 ppm Ga in S1 at eight hours. Higher loading could be obtained by additional extraction steps or longer runs.

EXAMPLE 9

Gallium was extracted from a phosphate treater dust leachate, using kerosene extractant solutions containing different concentrations of N-methylnonanohydroxamic acid. The aqueous leachate containing 176 ppm Ga and having a pH of 1.7 was mixed with an equal volume of the organic extractant for 10 minutes, followed by a 35 second separation. Results were as reported in Table 6.

TABLE 6

| % Hydroxamic Acid | % E | T(C.°) | pH |
|---|---|---|---|
| 10 | 64.2 | 61.7 | 2.14 |
| 20 | 72.8 | 60.0 | 1.79 |
| 30 | 78.3 | 61.0 | 1.66 |

The aqueous solutions were all unstable with respect to solids formation.

EXAMPLE 10

An extraction was carried out on an aqueous phosphate treater dust leachate solution having 10.5% P, 358 ppm Ga and a pH of 1.85. The extractant was a kerosene solution containing 29% by weight N-methyl isostearohydroxamic acid and 4% by weight N-methyl decanohydroxamic acid. The extraction was effected in 6 extractions in series using the same aqueous and organic solution and fresh leachate solutions, with Ga content in the aqueous raffinate and organic phase determined after each extraction. The loaded organic phase was then stripped three times with 20% sulfuric acid, with results reported in Table 7.

TABLE 7

| | Ga (ppm) | | | Ga (ppm) | % EGa from Feed |
|---|---|---|---|---|---|
| Raff. 1 | 12.9 | org. | 1 | 300.0 | 96.5 |
| 2 | 37.5 | | 2 | 600.8 | 89.5 |
| 3 | 49.2 | | 3 | 846.4 | 86.3 |
| 4 | 64.6 | | 4 | 1089 | 82.0 |
| 5 | 84.8 | | 5 | 1385 | 76.3 |
| 6 | 111 | | 6 | 1702 | 68.9 |

| H$_2$SO$_4$ Strip | Ga (ppm) | Stripped Organic | Ga (ppm) | % Ga Strip |
|---|---|---|---|---|
| 1 | 2949 | 1 | 603 | 64.6 |
| 2 | 1051 | 2 | 203 | 88.1 |
| 3 | 475 | 3 | 12.4 | 99.3 |

These data illustrate that very high single-stage recoveries and high gallium concentration enhancements are possible using these extractants. In conjunction with previous examples the results indicate that optimum extractions are obtainable by selecting optimum extractant structures on mixtures and are affected by conditions of the leachate feed, such as pH and phosphate concentration. This illustrates the effectiveness of hydroxamic acid blends.

EXAMPLE 11

The effectiveness of N-methyl naphthenohydroxamic acid and naphthenohydroxamic acid as agents for extraction and recovery of Ga ion was compared in similar procedures. The N-methyl naphthenohydoxamic acid was utilized as a 1M solution in kerosene solvent containing 10% isodecyl alcohol. The hydroxamic acid was assayed as 90.45% purity and used in amounts for 1M concentration of the pure material. The gallium-containing feed material was a phosphate treater dust leachate containing 119.39 ppm gallium, along with 1330 ppm Al, and 280.8 ppm Fe and some other metal components, and having a pH of 1.68. The leachate and the extractant solutions, in 20 ml portions, were poured into a jacketed beaker without mixing until an equilibration temperature of 47.8° C. was reached. The solutions were mixed for 5 minutes with a magnetic stirrer, with almost complete blending. The mixture was poured into a separatory funnel, and separation left 20.5 ml of organic phase which after dilution 3-fold with petroleum ether, was washed three times with 0.01M $Na_2SO_4$ in water. The aqueous phase from the original extraction had been returned to the jacketed beaker, and the extraction and washing steps were repeated twice more, but with ten minutes mixing being used in the third extraction. The first two organic samples obtained were light orange, while the third was orange. The samples were separately diluted to about 225 ml each with petroleum ether and 10 ml 2M $H_2SO_4$/2M $H_3PO_4$ was then added to each and blended with magnetic stirring. In 5 minutes, essentially all the color in all three samples disappeared. Analysis of the three organic samples prior to stripping indicated the percentages of gallium removed in the three extractions were respectively 20.8, 17.4 and 30.0, for a combined extraction of 68.2% in 20 minutes. The indicated near linear pick up of Ga with time indicates that higher extraction would be obtained with extended extraction times. Analysis of the stripping solutions indicated near 100% removal of the gallium from the organic medium. For the extraction with naphthenohydroxamic acid, a 1.080M solution in kerosene was used in 25 ml quantity to extract gallium from a 25 ml quantity of phosphate treater dust leachate having a pH of 1.49 and having 129.36 ppm Ga, 1319 ppm Al, 281.47 ppm Fe, and some other metals. The solutions were combined in a tall jacketed (50° C.) beaker, coming to thermal equilibrium at 48.4° C., and blended by stirring for 15 minutes. The mixture turned a dark orange. After separation, the organic phase was washed twice with 10 ml portions of 0.01M $Na_2SO_4$. The aqueous raffinate phase was washed three times with petroleum ether. The organic phase was diluted with petroleum ether to about 900 ml and then 25 ml 2M $H_2SO_4$/2M $H_3PO_4$ was added; vigorous mixing was started and continued for 70 minutes. The organic phase appeared to retain the same intensity of orange color, indicating the Fe was not stripping. Analysis of the stripping solution indicated that 88.5% of the Ga had been removed from the organic medium. A 50 ml amount of of 10N $H_2SO_4$ was added to the organic phase, and mixing was continued for an additional 90.2 hours. The stirrer was stopped and the organic phase was still colored. Analysis indicated that an additional 9.5% of the Ga had been removed. The results of the procedures are summarized in Table 8. The uncertainties are approximixately 10-15%.

TABLE 8

| AGENT | Ga | Fe | Al |
|---|---|---|---|
| N—methylnaphtheno-hydroxamic acid | | | |
| % extrac. in 20 min. | 68.2 | 44.5 | 0.14 |
| % stripped in 5 min. | ~100 | ~100 | ~100 |
| N—H naphtheno-hydroxamic acid | | | |
| % extrac. in 15 min. | 100 | 100 | 65.2 |
| % stripped in 18 hours | 88.5 | 79.3 | ~0 |

The data indicated that the gallium was very difficult to strip from the N-H hydroxamic acid, in contrast to the ready strippability from the N-methyl hydroxamic acid, and that the N-H agent was also much less selective with respect to gallium over Fe and Al in the extraction. The organic solutions remaining after the acid stripping were washed with water and the petroleum ether was stripped under vacuum. Analysis indicated the original 1M solution of N-methyl naphthenohydroxamic acid had been reduced to 0.8744M, possibly due to mechanical losses and some dilution. Analysis of the unsubstituted naphthenohydroxamic acid indicated 91% decomposition. This example also indicates the usefulness of diluting the organic phase with a volatile, water immiscible organic solvent to provide more complete stripping of metal. After stripping the extractant is regenerated by distilling off the volatile solvent. Both organic liquids are recycled.

EXAMPLE 12

An N-alkylhydroxamic acid, N-methyl naphthenohydroxamic acid, in a petroleum distillate, Kermac 470-B, was employed to extract gallium from a treater dust leachate filtrate, and the gallium was then stripped from the loaded organic medium by treatment with an equal volume of 20% $H_2SO_4$ for 10 minutes at 55° C. The organic medium was subsequently subjected to scrubbing with an equal volume of a mixture of equal volumes of sulfuric and phosphoric acids. Results for the various metals present in the starting acid leachate feed are shown below in Table 9.

TABLE 9

| METAL | Ga | Zn | Al | Fe | Mg | Na | K | V | Cr | Ni |
|---|---|---|---|---|---|---|---|---|---|---|
| Metal in Feed (PPM) | 324 | 80,000 | 5000 | 1300 | 1600 | 15,000 | 13,500 | 200 | 90 | 25 |
| Metal in Organic (PPM) | 932 | 0.9 | 13 | 347 | 0.1 | — | — | 110 | 0.6 | 4 |
| Metal in $H_2SO_4$ (PPM) | 980 | 7 | 2.1 | 0.08 | 0.4 | 10 | 6 | 0.5 | 0.05 | 1.1 |
| Metal in $H_2SO_4/H_3PO_4$ (PPM) | 0.8 | 0.7 | 3.9 | 363 | 0.2 | 7 | 10 | 37 | 2.9 | 0.9 |
| Concentrate Purity (%) | 96.8 | 0.72 | 0.2 | <0.01 | 0.04 | 1.0 | 1.0 | 0.05 | <0.01 | 0.11 |

The metal purity given in the Table is that of the hydroxide concentrate prepared from the material stripped by sulfuric acid. In addition, 81 ppm phosphate was present and the starting feed was 30% by weight phosphate. It will be noted that the extraction produced a relatively high gallium loading in the organic extractant, 932 ppm, and that the $H_2SO_4$ stripping similarly produced a relatively high gallium loading, 980 ppm. With respect to the iron content, it is noted that the extractant contained only 347 ppm, and that only a small amount was recovered in the sulfuric acid stripping solution, 0.08 ppm. However, the iron could be recovered under special conditions as shown by the 363 ppm iron content in the $H_2SO_4/H_3PO_4$ scrubbing solution. Some of the iron in the leachate feed was present as Fe (II) and not appreciably extracted under the extraction conditions, but the results are important in demonstrating that the gallium can be selectively stripped from an organic extractant in the presence of the iron which has been extracted. It is also significant that very little of the large amounts of Al and Zn were extracted or appear in the final concentrate. Some of the values in the stripping and scrub solutions are larger than those in the organic extractant; this appears due to slight variances in volume or within experimental error.

It is advantageous to have extractants from which Ga can be selectively recovered in the presence of iron and other metals. However, it is also desirable to have extractants from which iron can be stripped under appropriate conditions, in order to recover the extractant for futher use. In Table 10 below, stripping of Fe (III) is compared for one N-H hydroxamic acid and several N-alkyl hydroxamic acids. Conditions were similar, but various concentrations of sulfuric acid were used as reported.

TABLE 10

| EXTRACTANT | STRIP $[H_2SO_4]$ g/l | % STRIPPED | N—SUBSTITUENT |
|---|---|---|---|
| neotridecano HA | 150 | 36 | —H |
| N—methyldecano HA | 100 | >98 | —$CH_3$ |
| N—methyloctano HA | 150 | 94 | —$CH_3$ |
| N—isopropyldecano HA | 25 | 98 | —$CH(CH_3)_2$ |
| N—hexyldecano HA | 1.5 | >98 | —$(CH_2)_5CH_3$ |
| N—hexylpentano HA | 100 | >98 | —$(CH_2)_5CH_3$ |

The N-organo substituted hydroxamic acids used herein to extract gallium have various advantages over prominent commercially available or developmental extractants, many of which have limited applications which do not include gallium extraction. While consideration of more than a half-dozen of such types of previously known agents indicates that some of them possess a fair number of the following listed properties, none of them possess all of the desired properties, and even the previously known N-H hydroxamic acids are lacking in some of the desired properties. The desirable properties of the N-alkyl hydroxamic acids include high solubility not only in aromatic solvents, but also in kerosene and other aliphatic solvents, thereby avoiding the need for generally more costly aromatic solvents; low aqueous solubility; high hydrolytic stability; and high stability constant; selectivity with respect to metals; wide operating pH range including utility of both acid and basic stripping agents; fast strip kinetics; high metal loading; weak acid character; chelating mechanism; labile complexes with normally substitution inert metals; reversible Co extraction; environmental compatibility and low toxicity; performance modification by structure modification; relatively low cost; lack of acid or ammonia loading; lack of surfactant properties, including lack of such properties of potential hydrolysis products of particular classes; no anion carry over; no interference from $Ca^{2+}$ ion; and no need to use hydrochloric acid.

The ability of hydroxamic acids to extract metals from an aqueous solution is affected by the pH of the solution. The minimum pH's at which 50% of Fe (III) was extractible are reported for several hydroxamic acids in Table 11.

TABLE 11

| Hydroxamic Acid | N—Substituent | $pH_{\frac{1}{2}}$ |
|---|---|---|
| Neotridecano | —H | <0 |
| N—Methyldecano | —$CH_3$ | 1.08 |
| N—Isopropyldecano | —$CH(CH_3)_2$ | 2.90 |
| N—Hexyldecano | —$(CH_2)_5CH_3$ | 3.0 |

Tests were conducted on a series of hydroxamic acids to determine the percentages of the extractants pulled into an aqueous phase from an organic phase, by Fe (III) in 0.25M $H_2SO_4$ (pH=0.3) at 22° C. The conditions represent a severe test of aqueous solubility since the pH favors $FeA^{++}$ formation, where A=hydroxamate anion. For compounds represented by $CH_3(CH_2)_nC(O)N(OH)CH_3$, there was essentially no migration to the aqueous phase for n=8, 10, 12 or 14, and only a few percent migration for n=6, suggesting little or no migration for n=7 and indicating desirable lack of water solubility for N-methyl hydroxamic acids from N-methyl nonanohydroxamic acid through N-methyl hexadecanohydroxamic acids and on to higher carbon number hydroxamic acids. With regard to hydroxamic acids with n less than 6, a compound with n=4, i.e. N-methyl hexanohydroxamic acid, was approximately 35% pulled into the aqueous phase.

It is desirable that the extractant for metals have low solubility in water in order to avoid loss of extractant in aqueous media. In Table 12, the aqueous solubilities of a number of hydroxamic acids are reported.

TABLE 12
AQUEOUS SOLUBILITIES OF
N—ALKYLALKANO AND N—H HYDROXAMIC ACIDS

| EXTRACTANT | SOLUBILITY (25° C.) ppm | molarity |
|---|---|---|
| versatohydroxamic acid (not N—alkyl) | 1600. | $8.54 \times 10^{-3}$ |
| neotridecanohydroxamic acid (not N—alkyl) | 328. | $1.43 \times 10^{-3}$ |
| N—methyldecanohydroxamic acid | 111./82. | $5.48 \times 10^{-4}$ |
| N—methylhexadecanohydroxamic acid | 1.3 ± 1 | $4.60 \times 10^{-6}$ |
| N—isopropyldecanohydroxamic acid | 3.9 ± 1 | $1.68 \times 10^{-5}$ |
| N—hexyldecanohydroxamic acid | 1.6 ± 1 | $5.71 \times 10^{-6}$ |
| N—(1-nonyldecyl)cyclohexanohydroxamic acid | 0.7 ± 1 | $1.7 \times 10^{-6}$ |
| N—methylnonanohydroxamic acid | 409 | $2.18 \times 10^{-3}$ |

It will be noted that most of th N-alkyl hydroxamic acids have very low solubilitites in aqueous media, with the solubility tending to increase with decreasing number of carbon atoms in the hydroxamic acids. The N-methyl nonanohydroxamic acid has relatively high aqueous solubility; however, its solubility in a typical phosphate rock treater dust leachate (containing high concentrations of Al, Zn, Fe, phosphate and other ions) is markedly lower, being 20 ppm ($1.07 \times 10^{-4}$ molarity). This appreciable but limited solubility appears responsible for the effectiveness of N-methylnonanohydroxamic acid in extracting Ga from such leachates, with regard to both the rate and extent of the extraction compared to higher carbon number N-alkyl hydroxamic acids. For the extraction to occur, it is necessary that the extractant have some slight solubility in the aqueous Ga-containing medium.

With some of the higher molecular weight N-alkyl hydroxamic acids, a modifier is useful for augmenting solubility in such media as treater dust leachates, and in improving effectiveness of extraction from such media.

The organic solubilities and viscosity characteristics of N-alkylalkanohydroxamic acids, in comparison with N-H hydroxamic acids, are reported in Table 13.

TABLE 13

| HA | KEROSENE | KEROSENE WITH ISODECANOL | VISCOSITY ORGANIC SOL. |
|---|---|---|---|
| $CH_3(CH_2)_n\overset{O}{\overset{\|}{C}}NHOH$ (n ≥ 8) | V Insoluble | V Insoluble | — |
| Naphtheno HA | Low[1] | Low | High |
| Neotridecano HA | Soluble | Soluble | High |
| $CH_3(CH_2)_n\overset{OOH}{\overset{\|\ \|}{C}}NCH_3$ (n ≤ 10) | V Soluble[2] | V Soluble | V Low |
| $CH_3(CH_2)_n\overset{OOH}{\overset{\|\ \|}{C}}NCH_3$ (n ≥ 10) | ← insoluble (Room temp.) → <br> ← v. soluble (40° C.) → | | V Low |
| N—methyl naphtheno HA | V. Soluble[2] | V. Soluble | Medium |
| N—methyl isostearo HA | V. Soluble | V. Soluble | V. Low |

[1] Low = ≤ few %
[2] V. Soluble = dissolves in molar quantities (>1)
(V = very)

In general the N-alkylhydroxamic acids are more readily soluble in kerosene and similar aliphatic hydrocarbon solvents than the N-H hydroxamic acids. In addition, the N-alkyl hydroxamic acids in general give less viscous organic solutions than corresponding N-H hydroxamic acids, and are therefore easier to work with and less likely to cause mechanical problems if utilized in large scale commercial applications.

EXAMPLE 13

The effect of pH on Ga extraction was determined by measuring the percentage extraction at various pH's. The gallium was contained in a phosphate rock treater dust acid leach filtrate which contained 118 ppm Ga, 1370 ppm Al, 862 ppm Fe, 28,800 ppm Zn and 61,200 ppm P. The aqueous metal-containing solution was blended with an equal quantity of a 37% solution of N-methyl isostearolhydroxamic acid in a hydrocarbon solvent, a petroleum distillate designated as Kermac 470-B. The pH was periodically adjusted by addition of NaOH with mixing, and the amount of extraction into the organic medium was determined, with results as reported in Table 14. The pH is the equilibrium pH as determined following each addition.

TABLE 14

| pH | % E(Ga) | % E(Fe) | % E(Al) | % E(Zn) |
|---|---|---|---|---|
| 0.07 | 16.6 | 0.0 | 0.0 | 0 |
| 0.00 | 28.4 | 4.7 | 2.1 | 1.0 |
| 0.38 | 39.3 | 10.3 | −1.3 | 0.6 |
| 0.50 | 50.8 | 13.1 | −4.7 | 1.4 |
| 0.64 | 56.8 | 15.2 | 0.5 | 1.6 |
| 0.77 | 65.1 | 22.2 | −0.9 | 3.1 |
| 0.9 | 72.9 | 28.0 | −2.4 | 1.4 |
| 1.02 | 80.8 | 37.1 | 3.2 | 4.4 |
| 1.17 | 84.5 | 43.4 | 1.8 | 4.4 |
| 1.31 | 88.2 | 51.1 | 7.6 | 3.2 |
| 1.4 | 90.9 | 56.1 | 6.4 | 5.7 |
| 1.58 | 93.0 | 62.4 | 12.5 | 4.5 |
| 1.72 | 96.8 | 73.2 | 4.0 | 5.4 |
| 1.90 | 98.1 | 81.8 | 10.2 | 7.0 |
| 2.10 | 98.9 | 88.4 | 9.1 | 7.3 |
| 3.28 | 99.2 | | | |

The range of error in the determinations is estimated as approximately ±5%. The data demonstrate stronger complexing of Ga than of Fe (III), and high selectivity for Ga over Al and Zn. The preference over iron is in contrast to results which have been reported for a non-N-substituted hydroxamic acid, reported as more readily extracting Fe (III) than Ga, with data showing that the Fe (III) extracts at a lower pH; see Xiang et al, Acta Metallurgia Sinica 18 (2): 221-234 (1982) which reports on use of an undefined fatty acid hydroxamic acid, H 106, as an extractant.

Very limited water solubility is a characteristic of the N-organo hydroxamic acid extractants used herein. An efficient extraction requires that the extractant be much more soluble in an organic medium than in aqueous media. In addition, if the extractant has relatively high water solubility, there will be much loss of extractant in the aqueous phase raffinate. However, the extractant is being employed to extract metal ions from aqueous media, so it is essential that the extractants have some limited solubility in such media. It is generally desirable that the extractant solubility in the aqueous metal-containing phase not exceed 300 ppm. When very dilute aqueous solutions are involved, the solubility of the extractant in the solution may be similar to that in water itself. However, in the case of solutions of minerals, such as acid solutions from leachates of phosphate rock treater dust which contain fairly high concentrations of metal salts, the solubility of the extractant may be much lower in such solutions than in water. There is a salting out effect from the metal salts. In such cases the desirable solubility is to be considered with respect to the metal-containing solution from which the metal ions are to be extracted. Thus, the extractant will desirably have less than 300 ppm solubility in the aqueous medium from which metals are to be extracted. In order to improve the solubility of the extractant in metal-containing media, N-alkyl hydroxamic acids can be selected which have a carbon atom number toward the lower end of an eight to 20 carbon atom range. Even so, such extractants will have little solubility in water, generally less than 0.1%. Also it is possible to improve the extractant effectiveness by using certain co-extractant modifiers. Such modifiers include alkylphenols, such as one with 6 to 16 or so carbon atoms in the alkyl group. Other useful co-extractant modifiers include lower molecular weight N-alkylhydroxamic acids, such as N-alkyl alkanohydroxamic acids containing no more than 11 carbon atoms. Such co-extractants may aid in transporting gallium ions in the aqueous medium to the interface for complexing by the hydroxamic acid extractants present there.

While it is desirable to employ extractants with some limited solubility in the aqueous media being treated, it is also necessary to have agents with high solubility in the organic medium used, which is preferably an aliphatic hydrocarbon, and to have a sufficiently high number of carbon atoms to assure such high solubility. It is further desirable that the extractant have a high solubility ratio with respect to relative solubility in the organic medium compared to the aqueous medium, as expressed by partition ratios in organic:aqueous of >10:1, and preferably >20:1 and often >100:1.

The use of modifiers which improve extraction efficiency may also provide other advantages. For example, for extraction under acid conditions some extractants may ordinarily require a pH at least as high as 1.2 for desired extraction rate and extent; but with an effective modifier, such desired results may be obtainable with the same extractant at pH's as low as 0.8 to 0.9. In general, an effective modifier may extend the suitable pH range to values 0.3 or 0.4 units lower. With no modifier present, a desirable pH range for removing Ga from acid solutions having fairly substantial salt concentrations, such as leachates from phosphate rock treatments, is in the pH range of about 1.2 to about 1.6 A pH of 1.2 or above permits substantially complete Ga removal in three or four contacts; while a pH of 1.6 or lower tends to avoid any substantial precipitation of the metal ions present in the solution. On the other hand, if pH conditions which cause precipitation are employed, the solutions are more difficult to handle and extra filtrations may be required, or the precipitations may cause poor separations of some metals.

EXAMPLE 14

A number of extractions of gallium were carried out with different hydroxamic acid extractants and an additional catalyst or modifier. The gallium was extracted from aqueous solution at 60° C. with an equal volume of Kermac 470-B petroleum distillate containing the agents at a pH of 1, with mixing for 10 minutes. Results are reported in Table 15.

TABLE 15

| EXTRACTANT | (%) | MODIFIER | (%) | % EGa | % EFe | Tps (sec) |
|---|---|---|---|---|---|---|
| N—methyl naphtheno hydroxamic acid | 40 | none | 0 | 56.5 | | |
| N—methyl naphtheno hydroxamic acid | 40 | nonyl-phenol | 20 | 92.2 91.2 | 81 37 | |
| N—methyl naphtheno hydroxamic acid | 20 | nonyl-phenol | 10 | 80 68 | 30 | |
| N—methyl naphtheno hydroxamic acid | 20.5 | nonyl-phenol | 19.8 | 97.7 | | |
| N—methyl naphtheno hydroxamic acid (undistilled) | 20.2 | nonyl-phenol | 10.1 | 84.4 | | 5 |
| N—methyl isostearo-hydroxamic acid | 37 | none " | 0 20 | 70 92.6 | | 40 |
| N—methyl isostearo-hydroxamic acid | 41.0 | nonyl-phenol | 20 | 92.6 | | |
| N—methyl isostearo-hydroxamic acid | 20.4 | nonyl-phenol | 23.6 | 95.5 | | |
| N—methyl isostearo-hydroxamic acid (undistilled) | 20.0 | nonyl-phenol | 10.4 | 91.2 | | 60 |
| N—methyl isostearo-hydroxamic acid | 40 | dodecyl-phenol | 20.1 | 90.4 | | 60 |
| N—methyl isostearo-hydroxamic acid | 40.9 | Sterox ® ND | 19.8 | 27.2 | | 50 |
| N—methyl isostearo-hydroxamic acid | 39.8 | N—methyl-hexano HA | 19.8 | 72.2 | 47 | 56 |
| N—methyl isostearo-hydroxamic acid | 40.7 | neotri-decano acid | 19.8 | 58.0 | | |
| N—methyl nonano-hydroxamic acid | 20.1 | nonyl-phenol | 9.9 | 89.6 | | |
| N—methyl nonano-hydroxamic acid | 19.8 | nonyl- | 9.9 | 87.2 | | 10 |
| N—methyl-isostearo | 20.7 | nonyl-phenol & 20% neotridecano acid | 23.5 | 93.7 | | |

Sterox ® ND ethoxylated phenol is a trade marked product of Monsanto Company identified as a nonylphenol with the phenol group substituted with a four-group ethoxyl chain.

EXAMPLE 15

A number of gallium extractions were carried out utilizing a particular N-alkyl hydroxamic acid as a modifier with another N-alkyl hydroxamic acid extractant. The gallium-containing solution was an aqueous phosphate rock treater dust leachate containing 10.5% P, with a pH of 1.02. The extractions were carried out at 60° C., with results reported in Table 16.

TABLE 16

| EXTRACTANT | MODIFIER | % | % E Ga |
|---|---|---|---|
| N—methyl naphthenohydroxamic acid | 40 none | 0 | 70.1 |
| N—methyl naphthenohydroxamic acid | 40 N—methyldecanohydroxamic acid | 20 | 77.1 |
| N—methyl isostearaohydroxamic acid | 40 none | 0 | 52.1 |
| N—methyl isostearaohydroxamic acid | 40 N—methyldecanohydroxamic acid | 20 | 68.6 |
| N—methyl isostearaohydroxamic acid | 40 N—methyldodecylhydroxamic acid | 20 | 50.1 |
| N—methyl decanohydroxamic acid | 40 none | 0 | 63.0 |

EXAMPLE 16

A number of extraction runs were made employing N-methylnaphthenohydroxamic acid as an extractant with different modifiers. The kerosene extractant solutions continued 40% of the N-methyl naphthenohydroxamic acid and 20% of a modifier. The extractions were made from an equal volume of an aqueous phosphate leachate containing 303 ppm Ga, 73,000 ppm Zn, 4420 ppm Al, 4070 ppm Fe and 90,000 ppm P, at a pH of 0.99 and temperature of 60° C. with a 10 minute mixing time. Results are reported in Table 17.

TABLE 17

| MODIFIERS | % Extracted | | | | |
|---|---|---|---|---|---|
| | Ga | Zn | Fe | Al | P |
| None | 45.2 | 0 | little | 0 | 0 |
| Tributyl phosphate | 30 | 0 | 0 | 0 | 0 |
| 4-nonylphenol | 90 | 10 | 50 | 0 | 0 |
| Methylisobutyl ketone | 25 | 0 | 0 | 0 | 0 |
| Cyanex 272 modifier | 23 | 10 | 1 | — | — |
| Di-n-butyl butylphosphonate | 3 | 10 | 0 | 0 | 0 |
| LIX64N modifier | 86 | 0 | ~50 | 0 | 0 |
| Octyl, phenyl hydrogenphosphate | 66 | 10 | 50 | 0 | 0 |
| Kelex-100 | 97 | — | — | — | — |
| | 90 | | | | |

In the above table Cyanex 272 modifier designates the trade name modifier:

$$CH_3C(CH_3)_2CH_2CH(CH_3)CH_2-\underset{\underset{\bigcirc}{|}}{\overset{\overset{O}{\|}}{P}}-OH$$

and LIX64N modifier (not itself a Ga extractant) describes the trade name modifier:

(structure: 2-hydroxy-5-dodecylphenyl phenyl ketoxime with HO, NOH, C₁₂H₂₅ substituents)

Kelex-100 in the above table is a trade designation for a phenolic compound, which was the 1976 or earlier version of formula:

(8-hydroxyquinoline derivative with R substituent)

in which R represents:

$$-CH-CH_2-\underset{\underset{CH_3}{|}}{\overset{\overset{CH_3}{|}}{C}}-CH_2-\underset{\underset{CH_3}{|}}{\overset{\overset{CH_3}{|}}{C}}-CH_3$$
$$\underset{\underset{CH_2}{\|}}{\overset{|}{CH}}$$

EXAMPLE 17

An acidic mineral solution was prepared to resemble that from a zinc mining operation. Sulfuric acid, ferric nitrate, zinc sulfate and a gallium salt solution were mixed to have approximate concentrations of 200 ppm Ga, 20 grams/liter Fe (III), 120 grams/liter Zn (II) and 10 grams/liter $H_2SO_4$, with a pH of 0.34. To 25 ml of the solution, 1 gram of hydroxylamine sulfate was added in order to reduce the Fe (III) substantially to Fe (II). The solution was boiled for about 5–10 minutes, and 0.5 gram ZnO was added. The solution analyzed 146 ppm Ga, 1.50% Fe and pH was 0.406. The solution was mixed with 25 ml of a 0.874 molar solution of N-methyl naphthenohydroxamic acid in kerosene containing 10 volume % isodecanol for 30 minutes at 51° C. The aqueous raffinate solution was separated and washed twice with petroleum ether. The aqueous solution containing 65.9 ppm Ga, showing that 54.8% of the Ga had been extracted. The iron content was 1.46%, for an extraction of 2.7%. The pH of the aqueous phase was 0.339.

EXAMPLE 18

A 25 ml quantity of synthetic zinc leachate solution, as described in Example 17, was treated with a slight excess of hydroxylamine over the Fe (III) content, and stirred and heated to boiling. The solution was placed in a jacketed beaker at 50.3° C., and 25 ml of an 0.776M solution of N-methyl 2-hexyldecanohydroxamic acid in kerosene solvent containing 10% by weight isodecylalcohol was added and mixed for 15 minutes. The mixture was poured into a graduated cylinder and the red organic phase measured 23.6 ml and light green aqueous phase, 25.4 ml. The organic phase was removed, diluted with 2 parts petroleum ether, and stripped three times with 10 ml portions of 2M $H_2SO_4$. Results appear in Table 18.

TABLE 18

| Solution | O/A* | pH | Ga (ppm) | Zn (ppm) | Fe (ppm) | % Extraction Ga | Fe |
|---|---|---|---|---|---|---|---|
| Starting leachate | — | 0.406 | 146 | 98,400 | 15,000 | | |
| Aqueous Raffinate | 1 | 0.386 | 131 | 105,000 | 15,100 | 10.3 | ~0** |
| Strip #1 | 2.5 | — | 35.6 | 400 | 670 | | |
| Strip #2 | 2.5 | — | 2.95 | 321 | 62.6 | | |
| Strip #3 | 2.5 | — | 3.22 | 19.3 | 51.8 | | |

*Equals the organic to acid volume ratio in the extraction or stripping
**Near zero based on more iron in raffinate than in leachate; but ~2.1% based on iron total concentrations in strip solution, making allowance for difference in volumes.

The results in Table 18 show 15 ppm less Ga in the aqueous raffinate than in the starting leachate, while the first strip solution removed about 14 ppm Ga from the organic medium, when the 35.6 ppm is corrected as if the stripping solution were diluted to the volume of the organic medium. Thus, practically all the Ga was stripped in the one contact. The extraction and stripping showed excellent selectivity for Ga over Zn and Fe (II).

EXAMPLE 19

A bis-hydroxamic acid compound was employed as an extractant, N,N'-dimethyln-decylsuccinodihydroxamic acid. A sample of the compound, assayed as 58.1% pure, was used to prepare a 20.05% by weight solution (based on pure compound) in Kermac 470-B petroleum distillate containing about 20% by weight isodecyl alcohol, and also 13.98% by weight N-methyldecanohydroxamic acid. The extractant solution was used to extract gallium from an aqueous solution containing 358 ppm Ga and 1167 ppm Fe and having a pH of 1.0. A 16.7 ml amount of the organic solution was mixed with 10 ml of the aqueous Ga-containing solution. After difficulty in blending the solutions with a magnetic stirring bar, the solutions were blended for 10 minutes at near 60° C. Measurement by radioactivity indicated 86.3% extraction was obtained. The same organic solution was used to extract additional 10 ml portions of the aqueous Ga-containing feed, with 72.79% and 51.55% extractions being obtained. The Ga-loaded organic phase was stripped successively with several 10 ml portions of 20% $H_2SO_4$, with 76.88% stripping being obtained, and slightly over 13% in additional scrubbings with 20/20 mixtures of $H_2SO_4/H_3PO_4$.

EXAMPLE 20

A caustic solution was used to strip gallium from a gallium-loaded organic solution which had been obtained by extracting gallium from an aqueous solution. The aqueous solution of gallium was a 0.238M aqueous solution of $GaCl_3$ into 10 ml of which a 100 microliters quantity of Ga-67 stock solution was added for monitoring purposes. The organic extractant was a 1.046M solution of N-methyl stearohydroxamic acid in decyl alcohol which had been liquified by heating. A 20 ml amount of the organic extractant was added to the 10 ml of $GaCl_3$ solution which had been heated to 60° C. The starting $GaCl_3$ solution had a pH of 1.22. With the mixture at about 58.5° C., the extraction was monitored by taking 100 microliters samples of the aqueous phase, with about 49% of the Ga being extracted over a short time, while the pH declined to 0.52. Addition of 200 microliters of 10.00N NaOH raised the pH to 0.63 as further extraction occurred, and addition of a further 100 microliters (in increments) raised the pH to 2.24 and approximately 98.6% of the Ga was extracted into the organic extractant. The phases were separated, giving 7.5 ml of aqueous phase and 9.6 ml of organic phase. A 9.0 ml amount of distilled water was added to the organic phase, followed by 1 ml of 10N NaOH. The phases were blended for 17 minutes. Approximately 2 ml or so of water were accidentally added. Samples of the aqueous and organic levels were taken and radioactivity indicated a much higher concentration of the Ga in the aqueous phase than in the organic phase. Blending was continued 10 minutes more, and separation then occurred in a few seconds. The 13.2 ml organic phase was found to contain 5112 ppm Ga compared to 10,825 ppm Ga in the 7 ml aqueous phase, indicating that 52.9% of the Ga had been stripped from the organic phase. After removal of the aqueous phase, an additional 10 ml of 1.00M NaOH was added to the organic phase and mixed for 54 minutes at 60.0° C. Radioactive count of 100 microliters samples indicated that the 10.7 ml aqueous phase contained 5090 ppm Ga, compared to 813 ppm Ga in the 11.8 ml organic phase. The percentage of Ga which had been stripped in the second contact was 85.0%. The more complete stripping in the second contact is probably due to the larger excess of NaOH.

EXAMPLE 21

A 10 ml solution of 0.238M $GaCl_3$ was prepared, and 50 microliters of a Ga-67 solution was added for monitoring purposes. The solution at 59.5° C. had a 1.06 pH. A 29% by weight solution of N-methyl naphthenohydroxamic acid isodecyl alcohol was used as extractant. The organic extractant solution, 11.6 ml, was added to the 10 ml solution of $GaCl_3$, and the mixture was permitted to reach thermal equilibrium. The phases were blended for 6 minutes, while adding 760 microliters of 10.00N NaOH in increments of about 2 drops every few seconds when the pH fell to about 1. The blending was stopped with the temperature at 60.6° C., and the equilibrium pH at 3.47. The aqueous phase now was 8.8 ml and the organic phase was 10.4 ml. The radioactivity count of a 100 microliter sample of the aqueous phase was now 2284 cpm, compared to a starting 113,812 cpm, showing 98.0% extraction of the Ga. After removal of the aqueous phase, the organic phase was 10.2 ml, and it was added to a jacketed beaker at 60° C. A 20 ml quantity of 2N NaOH was added and allowed to reach thermal equilibrium. The phases were blended for 60 seconds, at a temperature of 60.3 C. Phase separation did not occur. Blending was continued for 9 minutes, with one interruption to test phase separation. The phases still did not separate. The pH of the mixture was 12.47. At intervals, 250 microliter portions of 10N $H_2SO_4$ were added with blending, and after four additions, and an additional 0.1 ml addition, phase separation was obtained at a pH of 12.21 and temperature of 59.5° C. Samples (100 microliter) of the aqueous and organic phase had radioactive counts of 42,952 CPm and 58,698 CPm, respectively. The aqueous phase was 5.88 ml and the organic was 12.36 ml. The relative radioactive counts and solution volumes indicate that 25.8% of the Ga had been stripped from the organic medium.

EXAMPLE 22

A tris-(N-methyl nonanohydroxamic acid) Ga+3 complex was prepared from the hydroxamic acid and gallium sulfate. A 0.15 mole quantity of N-methyl nonanohydroxamic acid was employed, using 28.92 grams of 97% purity compound. The hydroxamic acid was added to a reaction flask, along with 250 ml of an isomeric mixture of hexanes. A 39 ml quantity of an aqueous gallium sulfate solution was added. The solution contained 90.8 grams Ga per liter, so 0.05 moles Ga was provided. The mixture was blended by stirring. An addition funnel was provided with 150 ml of 1N NaOH, by theory sufficient to neutralize hydrogen ions produced when the hydroxamic acid complexes the gallium. The sodium hydroxide was added in over 0.5 hour, with the reaction mixture (heated by oil bath) at a temperature of about 60° C., and pH of 2 to 3. Additional quantities of 1N NaOH were added over an additional hour or so to pH 3-4, and the reaction mixture was stirred an additional 0.75 hour and permitted to stand overnight. The two clear, colorless phases contained a small amount of white solid which was removed by filtration. Analysis of the aqueous phase showed 0.0021 moles Ga remained in the aqueous phase, indicating 96% conversion of the gallium sulfate to the gallium hydroxamic acid complex. The reaction mixture was heated to 50° C. to aid phase separation, and the phases were separated. The product-containing organic phase was washed with an equal volume of water and then stirred with anhydrous $Na_2SO_4$. After filtration, the solution was stripped on a rotovap apparatus to leave a viscous, slightly yellow liquid, 15.7 grams. The purity was determined by treatment of a sample of the product with 30% $H_2SO_4$, to strip the product into the aqueous acid phase for Ga determination by analysis. A 20 ml solution of a 0.5M concentration of the complex in petroleum distillate (Kermac 470-B) was treated three times with 20 ml portions of 30% $H_2SO_4$, and the acid solutions were then combined for Ga determination. The Ga was 89% of that for a pure complex. The complex, a clear, light yellow viscous oil is represented by the formula:

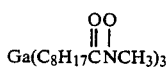

Elemental analysis, molecular weight (vapor phase osmometry): Found: C 57.43; H 9.64; N 6.62; MW 599. Calculated: C 57.33; H 9.62; N 6.69; MW 629.

The starting N-methyl nonanohydroxamic acid was prepared by acylation of methyl hydroxylamine with nonanoyl chloride and was a white, waxy solid, M.P. 29° C., represented by the formula $C_{10}H_{21}NO_2$.

Elemental analysis, molecular weight (mass spectrometry): Found: C 64.06; H 11.32; N 7.36; MW 187. Calculated: C 64.13; H 11.30; N 7.48; MW 187.

EXAMPLE 23

A tris(N-methyl naphthenohydroxamato) Ga+3 complex was prepared from gallium sulfate and N-methyl naphthenohydroxamic acid. A 0.15 mole quantity of N-methyl naphthenohydroxamic acid (~300 M.W.) was added to a reaction flask and 38.5 ml of aqueous gallium sulfate was added to provide 0.05 moles gallium sulfate. The mixture was stirred at 60° C., and 150 ml 1N NaOH was added in increments in about 20 minutes. An additional 150 ml 1N NaOH was added over about 1 hour. Analysis of Ga remaining in the aqueous phase indicated 87% conversion of gallium to a hydroxamic acid complex. After standing overnight, the phases were separated and the organic phase was washed with water, dried over anhydrous $Na_2SO_4$, filtered and stripped of solvent to leave a light yellow, viscous liquid product. The product was fluid at elevated temperature but solid at room temperature. The product weighed 37.60 grams. Purity was determined by stripping with sulfuric acid, as in Example 22, and was found to be 82%.

The complex, a light yellow, clear viscous oil, is represented by the formula:

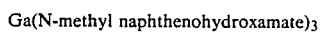

wherein the N-methyl naphthenohydroxamate moiety has an approximate average molecular weight for the formula

Elemental Analysis, molecular weight (vapor phase osmometry): Found: C 68.86; H 10.56; N 4.22; MW 834. Calcuated: C 64.02; H 10.75; N 4.67; MW 901.

The N-methyl naphthenohydroxamic acid used in the preparation was prepared by acylation of methyl hydroxyl amine with naphthenoyl chloride and was a light yellow, clear viscous oil, represented by the (average) formula: $C_{16}H_{33}NO_2$ Elemental Analysis, molecular weight (mass spectrometry): Found: C 71.48; H 11.17; N 4.89; MW range 227–353. Calculated: C 69.14; H 11.97; N 5.04; MW 278.

N-methyl 2-hexyldecanohydroxamic acid was prepared in accord with procedures described herein. The compound was a light yellow, medium viscosity, thin oil. It analyzed as 91.7% pure by spectrophotographic analysis based upon absorption of its monohydroxamato iron (III) complex, and 94% by gas chromatography, with 3% carboxylic acid and 3% diacylhydroxylamine impurities.

Elemental Analysis, molecular weight (mass spectrometry): Found: C 71.24; H 12.45; N 5.20; MW 285. Calculated: C 71.53; H 12.36; N 4.91; MW 285.

NMR was consistent with the assigned structure and G.C. mass spec. indicated a molecular weight of 285 by parent ion peak.

N-methyl isostearohydroxamic acid was prepared in accord with procedures described herein. The compound was a light yellow, low viscosity oil. It assayed as 84% pure by spectrophotographic analysis based upon the monohydroxamato iron (III) derivative, and NMR was consistent with the assigned structure. Molecular weight by G.C. mass spec. was 285. The isostearyl group was a linear $C_{16}$ group with random methyl substitution along the chain.

Elemental analysis, molecular weight (mass spectrometry) for:

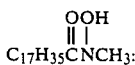

Found: C 71.97; H 13.07; N 5.03; MW 313. Calculated: C 72.79; H 12.54; N 4.47; MW 313.

EXAMPLE 24

A solution was prepared containing 30% by weight N-methyl naphthenohydroxamic acid in kerosene solvent containing 5% by volume isodecanol. A gallium sulfate solution was prepared by mixing 1 ml of an aqueous gallium sulfate solution, 90.8 grams/liter concentration, with 25 ml deionized water. The thus prepared solution was blended with 25 ml of the N-methyl naphtheno hydroxamic acid solution and 800 microliters of 10N NaOH was added from a microburette. The aqueous phase, of pH 8.26, was found to give a negative test for hydroxamic acid and to contain less than 5 ppm Ga by atomic absorption determination. The gallium had been extracted into the organic solution. The aqueous phase was replaced with an equal volume of 0.1M sodium acetate, which gave a pH 8.21. A 60 microliter amount of 10N NaOH was added, which gave a 9.3 pH after the phases were blended for 20 minutes. Analysis showed 55 ppm Ga in the aqueous phase, which was only a small fraction of the 3632 ppm in the organic phase; this demonstrates that very little of the Ga was stripped into the aqueous phase, and conversely that practically all of the Ga can be extracted into the organic phase at this pH. Additional increments of 10N NaOH were added and gallium concentrations were determined after blending, with results as reported in Table 19. All blending operations were conducted at about 60° C.

TABLE 19

| Total NaOH (microliter) | pH | Aqueous Phase Ga (ppm) | % Stripping in aqueous phase | HA |
|---|---|---|---|---|
| 60 | 9.3 | 55 | — | |
| 100 | 9.34 | 15 | — | |
| 180 | 9.95 | 15 | — | |
| 300 | 10.57 | 35 | — | negative |
| 700 | 10.94 | 15 | — | |
| 3500 | 11.91 | 2195 | 60.4% | 0.65 molar |
| Add 10 ml isodecanol | — | — | 89.2% | negative |

The results in Table 19 indicate that the stripping into the aqueous phase is almost negligible at pH below about 11, and in fact the 15 ppm values reported are at about the limit of the analytical method used. With the very low stripping, it is also evident that nearly complete extraction of Ga is obtainable in the pH range of about 9 to 11, and that, with the good extraction reported in Example 24 for pH 8.26, shows that good extraction is obtainable at lower pH's. It appears that efficient extraction can be effected under alkaline conditions ranging from pH 7 to about 11. In the initial result at pH 11.91, a large amount of the hydroxamic acid was stripped into the aqueous phase. However, after an additional amount of isodecanol was added, the phases were easily separated and hydroxamic acid was not found in the aqueous phase. Thus, for pH over about 11.5 it is greatly advantageous to have a coordination solvent such as a long-chain alkanol or other water-insoluble alcohol present in substantial quantity, such as around 20% or more by volume of the organic solvents present. The coordinating solvent modifier assists in phase separation and in avoiding undue loss of the hydroxamic acid to the aqueous stripping solution. Of course stripping the gallium can be accomplished despite significant loss of the hydroxamic acid, and the hydroxamic acid can be recycled with the stripping solution or recovered therefrom.

Under the illustrated conditions, there is very little stripping of gallium values at about pH 11 and nearly complete stripping at about pH 12, and likely about 50% stripping at about pH 11.5. This indicates that some extraction is obtainable in pH ranges up to about 12 or so, but extraction is more efficient at pH's near 11 or lower. However, the marginal results can be improved by using higher concentrations of the hydroxamic acid extractant, and the ranges may vary somewhat with the particular extractant or conditions. Moreover, other mechanisms may make some extraction possible at pH's above 12. While the present invention is not limited by theory or mechanism, it is probable the extraction depends mainly upon neutral complexes of gallium with the hydroxamic acid, although charged species can be formed.

An efficient extraction and recovery process can extract Ga with N-organo hydroxamic acid at pH of about 7 to 11, recover the Ga from the extractant by stripping with aqueous alkaline medium at pH of about 11 to about 12, particularly at about 11.5 to 12. The thus-described extraction and recovery process will be particularly useful for recovering gallium from alkaline solution sources of gallium. For example, Baeyer process liquors from an alumina treatment process typically contains 160 grams per liter sodium oxide, 80 grams per liter aluminum oxide and 0.25 grams per liter Ga, and is strongly alkaline. The alkalinity can be adjusted by addition of acid to a pH less than about 11, and the extraction with an N-organo hydroxamic acid can then be conducted efficiently, followed by stripping with an alkaline solution at pH over about 11. Carbonation by treatment with carbon dioxide is a convenient method of adjusting the pH, and such carbonation also causes precipitation of aluminum values.

It is also feasible to convert gallium salt-containing solutions from acid sources to alkaline solutions for extraction.

For example, the acid leachate from treatment of phosphate treater dust can be neutralized and made alkaline by addition of KOH or NaOH and the gallium values can then be extracted by contact with an organic medium containing N-organo hydroxamic acid. The alkalinization will cause some phosphate salts to precipitate or form a high solids slurry and it will be desirable to remove the solids by filtration. While the gallium can be extracted at pH's from about 7 to about 11 or so, it will be desirable with such phosphate solutions to operate at about pH 10 or above to have the advantage of other salt solubilities. Ordinarily it will be preferable to extract gallium from treater dust leachate under acid conditions, and avoid solids-handling operations. However, at times there may be reasons for operating under alkaline conditions, or particular side-products which are wanted.

We claim:

1. A process for recovering gallium from aqueous solutions containing gallium which comprises contacting such a solution with an organic solvent containing at least 2% by weight of a water-insoluble N-organo hydroxamic acid having at least about 8 carbon atoms to extract gallium, and separating the gallium loaded organic solvent phase from the aqueous phase.

2. The process of claim 1 in which the contact is effected at an acid pH sufficiently high to permit extraction of more than 50% of the gallium, but sufficiently low to prevent substantial precipitation of minerals present in the aqueous solution.

3. The process of claim 1 in which the aqueous solution is an acid leachate from treater dust, a by-product of phosphate rock processing, and contains phosphorus, iron and other metals.

4. The process of claim 1 in which an N-alkyl hydoxamic acid is employed.

5. The process of claim 1 in which the N-methylhydroxamic acid is employed.

6. The process of claim 1 in which the hydroxamic acid is represented by the formula $CH_3(CH_2)_mC(O)N-(OH)(CH_2)_nCH_3$ and m is an integer from 6 to 16 and n is an integer from 0 to 6.

7. The process of claim 1 in which the hydroxamic acid is N-alkyl alkano hydroxamic acid with up to 3 carbon atoms in the alkyl group and a total of about 10 to about 20 carbon atoms.

8. The process of claim 1 in which the hydroxamic acid is N-Methyl nonanohydroxamic acid.

9. The process of claim 1 in which the hydroxamic acid is N-methyl naphtheno-hydroxamic acid.

10. The process of claim 1 in which the hydroxamic acid is N-methyl 2-hexyldecanohydroxamic acid.

11. The process of claim 1 in which the major part of the extraction is effected in a pH range of about 1.2 to about 1.6.

12. The process of claim 11 in which the extraction is effected at a temperature in the range of 35° to 70° C.

13. The process of claim 1 in which the hydroxamic acid concentration in the organic solvent is at least 10% by weight.

14. The process of claim 12 in which the hydroxamic acid concentration in the organic solvent is at least 20% by weight.

15. The process of claim 1 in which the process is conducted with a hydroxamic acid and conditions so as to extract at least 60% of the gallium in no more than 10 minutes contact.

16. The process of claim 1 in which the gallium is stripped from the organic phase by a strong acid solution.

17. The process of claim 16 in which the acid solution is sufficiently effective to strip at least 50% of the gallium in 10 minutes.

18. The process of claim 16 in which the aqueous solution contained a substantial amount of iron and the extraction and stripping were sufficiently selective to provide a gallium percentage yield more than 5 times that of the iron percentage yield.

19. The process of claim 16 in which the hydroxamic acid is sufficiently stable under the extraction and stripping conditions that less than 1% of it is hydrolyzed in an extraction-stripping cycle.

20. The process of claim 1 in which a hydrolytically stable N-alkylalkanohydroxamic acid with 8 to 18 carbon atoms is employed in a substantially aliphatic hydrocarbon solvent at temperatures in the range of about 30° C. to 70° C. and pH's in the range of about 1.2 to about 1.6 to remove gallium from an aqueous solution containing substantial amounts of iron, aluminum, zinc and phosphate ions.

21. The process of claim 1 in which a combination of hydroxamic acids is used, of which one has a lower molecular weight than another in order to promote solubility of the hydroxamic acids in the aqueous Ga-containing medium.

22. The process of claim 21 in which the lower molecular weight hydroxamic acid has no more than 11 carbon atoms.

23. The process of claim 1 in which the Ga is stripped from the organic phase with an alkaline solution.

24. The process of claim 23 in which the Ga is stripped with an aqueous solution having a pH of at least about 12.

25. The process of claim 1 in which the major part of the extraction is effected at a pH in the range of about 7 to about 11.

26. The process of claim 25 in which the gallium is stripped from the gallium loaded organic solvent by an aqueous solution having a pH above about 11.

27. The process of claim 26 in which the gallium is stripped at a pH in the range of about 11 to about 12 with little loss of hydroxamic acid extractant to the aqueous solution.

28. The process of claim 26 in which an aliphatic alcohol coordination solvent is employed to aid phase separation.

* * * * *

UNITED STATES PATENT AND TRADEMARK OFFICE
CERTIFICATE OF CORRECTION

Page 1 of 2

PATENT NO. : 4,741,887
DATED : May 3, 1988
INVENTOR(S) : J. P. Coleman et al

It is certified that error appears in the above-identified patent and that said Letters Patent is hereby corrected as shown below:

In column 7, line 39, delete "posphorous" and insert therefor --phosphorous--.

In Column 8, line 38, delete "880.6%" and insert therefor --80.6%--.

In column 9, line 62, delete "exraction" and insert therefor --extraction--.

In column 10, line 57, delete "35%" and insert therefor --34%--.

In column 12, line 24, after the number "4" insert --are--.

In column 13, line 58, delete "Frdom" and insert therefor --From--.

In column 17, lines 20-21, delete "apapropriate" and insert therefor --appropriate--.

In column 18, line 19, delete "migaration" and insert therefor --migration--.

In column 18, line 48, delete "th" and insert therfor --the--.

In Column 22, Table 15, line 33 of the Table, delete "nonyl" and insert therefor --nonylphenol--.

UNITED STATES PATENT AND TRADEMARK OFFICE
CERTIFICATE OF CORRECTION

Page 2 of 2

PATENT NO. : 4,741,887

DATED : May 3, 1988

INVENTOR(S) : J. P. Colemam et al

It is certified that error appears in the above-identified patent and that said Letters Patent is hereby corrected as shown below:

In column 28, line 26, delete "Calcuated" and insert therefor --Calculated--.

In column 31, line 8, delete "hydoxamic" and insert therefor --hydroxamic--.

Signed and Sealed this

Seventh Day of May, 1991

Attest:

HARRY F. MANBECK, JR.

*Attesting Officer*    *Commissioner of Patents and Trademarks*